United States Patent
McGolden

(10) Patent No.: US 11,613,705 B2
(45) Date of Patent: Mar. 28, 2023

(54) METHOD AND SYSTEM FOR GASIFICATION OF BIOMASS

(71) Applicant: Michael McGolden, Evansville, IN (US)

(72) Inventor: Michael McGolden, Evansville, IN (US)

(73) Assignee: McGolden, LLC, Evansville, IN (US)

( * ) Notice: Subject to any disclaimer, the term of this patent is extended or adjusted under 35 U.S.C. 154(b) by 782 days.

(21) Appl. No.: 14/356,977

(22) PCT Filed: Feb. 6, 2013

(86) PCT No.: PCT/US2013/024870
§ 371 (c)(1),
(2) Date: May 8, 2014

(87) PCT Pub. No.: WO2013/126211
PCT Pub. Date: Aug. 29, 2013

(65) Prior Publication Data
US 2014/0332363 A1    Nov. 13, 2014

Related U.S. Application Data

(60) Provisional application No. 61/755,493, filed on Jan. 23, 2013, provisional application No. 61/595,253, filed on Feb. 6, 2012.

(51) Int. Cl.
*C10B 57/10* (2006.01)
*F23G 5/027* (2006.01)
(Continued)

(52) U.S. Cl.
CPC .............. *C10B 57/10* (2013.01); *C05F 11/00* (2013.01); *C10B 49/04* (2013.01); *C10B 53/00* (2013.01);
(Continued)

(58) Field of Classification Search
CPC ....... C10J 3/14; C10J 3/46; C10J 3/726; C10J 2300/0909; C10J 2300/0916; C10B 49/04;
(Continued)

(56) References Cited

U.S. PATENT DOCUMENTS 4,764,185 A * 8/1988 Mayer ................. C10J 3/26
48/111
5,024,820 A * 6/1991 Coutiere ............ B01D 11/0223
208/311
(Continued)

FOREIGN PATENT DOCUMENTS

CH    703513    9/2014
CN    101245250    8/2008
(Continued)

OTHER PUBLICATIONS

European Supplemental Search Report dated Aug. 20, 2015.
(Continued)

*Primary Examiner* — Patrick Orme
(74) *Attorney, Agent, or Firm* — Mallory M. Henninger; Advent, LLP

(57) ABSTRACT

A continuous system for gasification of a biomass feedstock comprising: a fuel conditioning zone, a gasification zone and a char cooling area.

15 Claims, 2 Drawing Sheets

(51) Int. Cl.
*C10B 49/04* (2006.01)
*C10L 5/42* (2006.01)
*C10J 3/72* (2006.01)
*C10B 53/00* (2006.01)
*C05F 11/00* (2006.01)
*F23J 1/02* (2006.01)
*C10J 3/30* (2006.01)

(52) U.S. Cl.
CPC ............... *C10J 3/30* (2013.01); *C10J 3/723* (2013.01); *C10L 5/42* (2013.01); *F23G 5/027* (2013.01); *F23J 1/02* (2013.01); *C10J 2200/152* (2013.01); *C10J 2200/158* (2013.01); *C10J 2300/0909* (2013.01); *C10J 2300/0916* (2013.01); *C10J 2300/0956* (2013.01); *F23G 2201/40* (2013.01); *Y02E 50/10* (2013.01); *Y02E 50/30* (2013.01); *Y02P 20/145* (2015.11)

(58) Field of Classification Search
CPC ..... C10B 57/10; F23G 5/027; F23G 2201/40; C10L 5/42
See application file for complete search history.

(56) References Cited

U.S. PATENT DOCUMENTS

| | | | | |
|---|---|---|---|---|
| 5,094,669 | A * | 3/1992 | Herbert | C10J 3/02 48/197 R |
| 5,096,463 | A | 3/1992 | Beierle | |
| 5,589,599 | A * | 12/1996 | McMullen | C01B 31/08 208/13 |
| 5,601,692 | A * | 2/1997 | Rinker | C10L 9/00 201/28 |
| 5,720,165 | A | 2/1998 | Rizzie et al. | |
| 6,485,296 | B1 * | 11/2002 | Bender | C10J 3/14 110/203 |
| 2004/0107638 | A1 * | 6/2004 | Graham | C10J 3/30 48/197 FM |
| 2008/0209807 | A1 * | 9/2008 | Tsangaris | C10J 3/20 48/89 |
| 2010/0101141 | A1 * | 4/2010 | Shulenberger | C10B 47/44 44/589 |
| 2010/0223846 | A1 | 9/2010 | Yang | |
| 2011/0114144 | A1 * | 5/2011 | Green | C05D 9/00 136/201 |
| 2011/0232191 | A1 | 9/2011 | Diebold et al. | |
| 2011/0258914 | A1 | 10/2011 | Banasiak | |
| 2013/0098750 | A1 * | 4/2013 | Nickerson | C10J 3/007 201/1 |

FOREIGN PATENT DOCUMENTS

| | | |
|---|---|---|
| CN | 201348276 | 11/2009 |
| CN | 101781585 | 7/2010 |
| CN | 201952404 | 8/2011 |
| CN | 201999893 | 10/2011 |
| EP | 1312662 | 5/2003 |
| JP | 2006083293 | 3/2006 |
| JP | 2006335956 | 12/2006 |
| WO | WO2009-020442 | 2/2009 |
| WO | 2009124359 | 10/2009 |
| WO | 2010128055 | 11/2010 |

OTHER PUBLICATIONS

Chinese Office Action & Search Report dated Sep. 25, 2015.
Notification of Transmittal of the International Search Report and the Written Opinion of the International Searching Authority—dated Jun. 2, 2013.
Chinese Office Action & Search Report dated May 20, 2016.
Office Action and Search Report dated 2015/25/09 in Chinese Application # 201380008372.2.
Office Action dated Mar. 2, 2017 for European Appln. No. 13751926.0.

* cited by examiner

METHOD AND SYSTEM FOR GASIFICATION OF BIOMASS

BACKGROUND

There have been a number of challenges when dealing with oxygen starved gasification that evolved around the material handling and crusting or agglomerate formation in certain reaction zones of the gasifier design. Conventional gasification units have had limited success with high ash materials as they tend to form agglomerate (crusting or clinker formation) at lower temperatures than traditional woody biomass systems. Biochar is the ash byproduct of the gasification process. While ash has been used as a fertilizer for many years the benefits of leaving carbon in the ash has only recently been established.

Accordingly, there is a need for a system and method of producing energy from biomass that is designed to address these operational issues as well as produce a marketable "BioChar". There is a further need for a biomass gasification system useable with high ash feedstocks.

DETAILED DESCRIPTION

The general principle is that, by controlling the air and biomass movement through the unit, higher or lower levels of carbon in the ash may be developed and maximize the ash's value as both a fertilizer and/or method of holding carbon in the soil for long periods of time.

The present system is particularly well suited for on-site heat production as part of larger facility. However, it is conceivable that the present system could be used to utilize high ash biomass as an energy source for electricity production.

Figure 1:
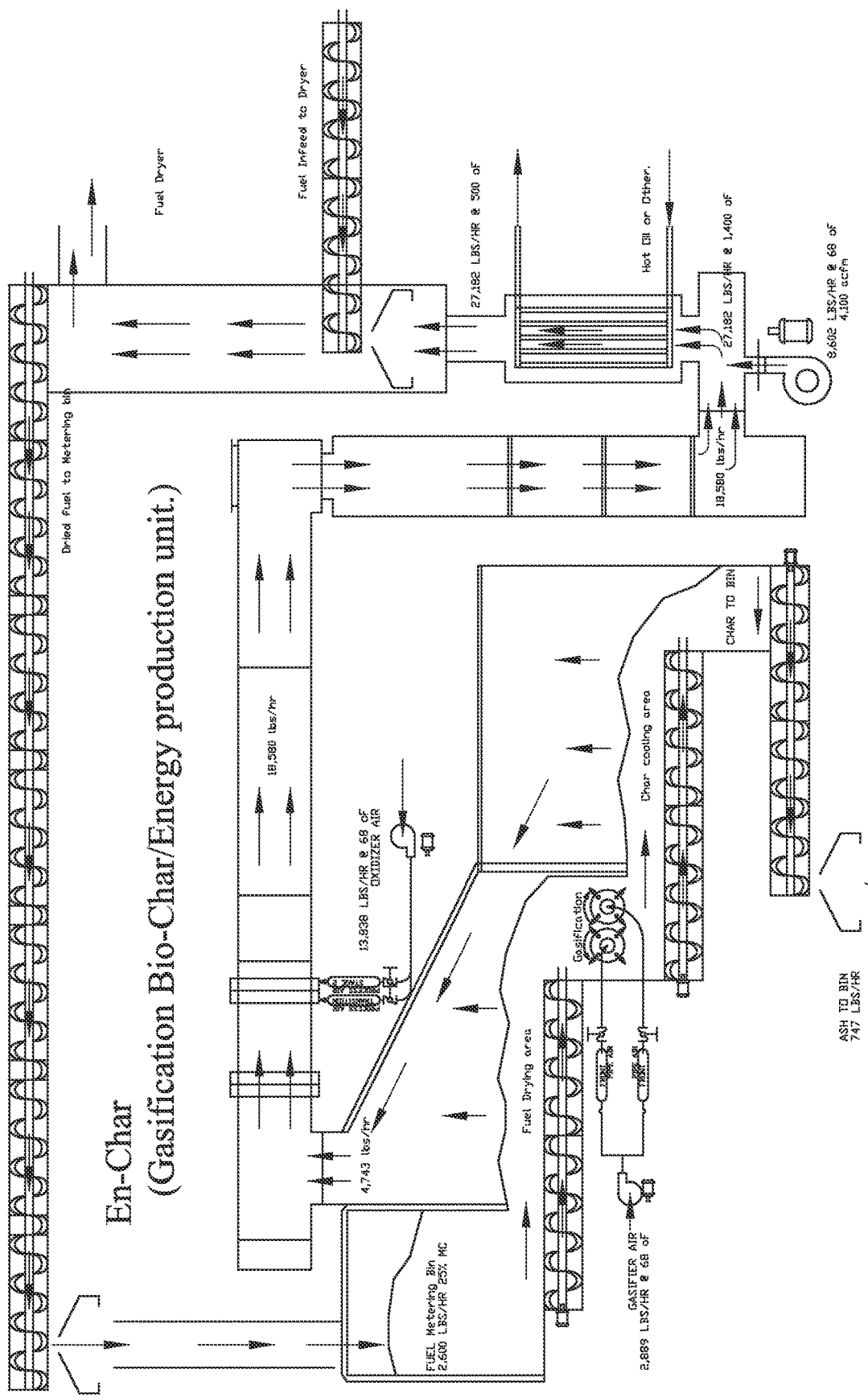
FIG. 1. is a schematic view of a biomass gasification system for use with high ash feedstocks.

Referring to FIG. 1, fuel is introduced to a dryer. While generally any biomass material may be used, the present system is most advantageous in its handling of high ash feedstocks such as animal manure.

Biomass fuel generally contains large amounts of moisture. There are a number of methods for removing the moisture. In some embodiments, a commercial dryer may be added to the system. This will not be required with all biomass fuels. Standard equipment would also be used to introduce material to the front end of the gasification process.

After conditioning of the fuel it may be introduced and moved with augers through the various zones. The speed of these augers is controlled so that the material is being taken away at the same speed that it is introduced. This not only produces a continuous process but also allows for fine control of the rate and extent of reaction. With this process, the amount of the fixed carbon that will be left in the char may be adjusted by varying the feedstock feed rate as well as the feed rates of air as it is added in different zones of the process.

Figure 2:
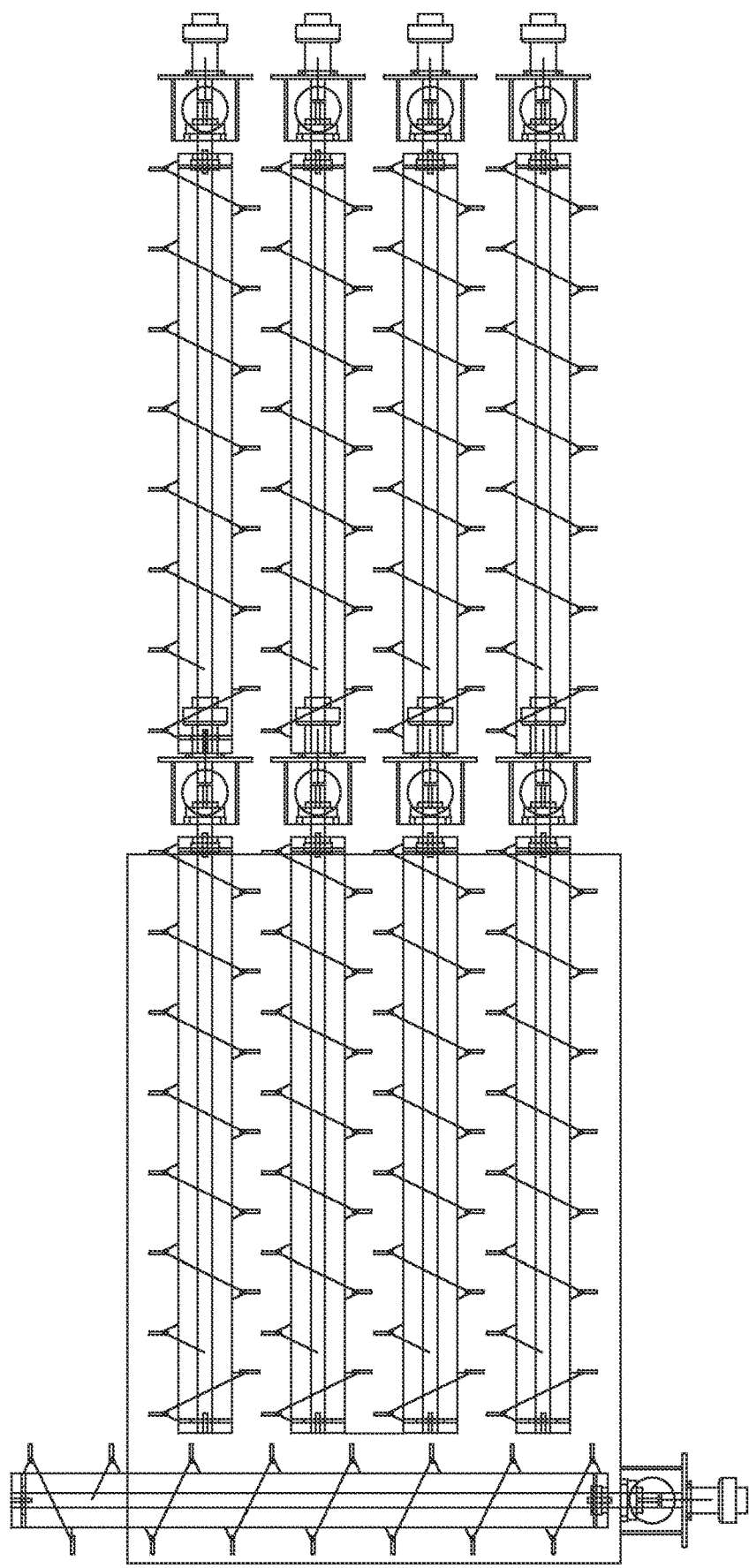
FIG. 2 is a top view of auger system for controlling the movement of biomass through the gasification system.

The augers (as shown in FIG. 2) lie side by side forming a live floor that moves material evenly across the length and width of the unit. A char removal auger is also shown running transverse to the direction of the other augers. The fuel and char may be maintained at levels to prevent excess air from entering the unit.

There are two different methods of introducing air to the "reaction zone". In this zone a portion of the volatile carbon material and possibly some of the fixed carbon are oxidized to produce enough heat to drive off the volatiles in the rest of the biomass material. In some embodiments, approximately ¼ of the air required for complete oxidation is introduced into this zone, however, this amount may vary depending on conditions and biomass.

Air can be introduced with stationary multiple inlet points or by using a rotary air delivery system. Testing has shown that by keeping the air and biomass fuel moving, high temperature zones (hotspots) can be avoided and reduce or eliminate crusting and/or agglomerate formation. A rotary air system may ensure that material can pass through this zone without problems. The combination of moving air and the disturbance to the biomass material around the "disc" design shown will continuously bring new material into and through the reaction zone. Keeping the air and biomass fuel moving will generate considerable heat energy and a producer gas with high levels of CO and H2 with other volatile compounds. This producer gas can then be used for various applications such as being fired in a low BTU combustion engine or turbine. Alternatively, the producer gas may be oxidized in a second chamber to produce a high temperature oxidized flue gas for use in downstream equipment such as boilers or hot oil heat exchangers.

The producer gas passes up over the fuel and is combined with the volatiles from the char cooling area as well as the drying and conditioning areas of the gasifier. This process will transfer some of the heat down through the fuel being introduced and help with the drying of the material before it reaches the air in the reaction zone. The resulting gas from the total process will then go to a second chamber where the rest of the air required for complete oxidation is added or the gas could be cleaned for other applications. Alternative processes could include the catalytic oxidation of all or a portion of the producer gas.

In an exemplary embodiment, the producer gas from the unit will generally be in the 400 to 600 C. range and contain levels of CO, CO4, and H2 as well as other compounds. When oxidized in the upper chamber the resulting flue gas may typically be in the 1200 C. range. This flue gas can then be used for other energy applications.

The resulting char is removed from the unit. A level of char is maintained in the unit to prevent air from entering into the reaction area. The quantitative qualities of the char can be adjusted to meet market demands by speeding up the flow or slowing it down, or adjusting the amount of air introduced into the various regions. When the char is cooled, relatively high levels of CO may be released. This will pass up over the gasifier reacting area as well as the fuel conditioning area to be added to the producer gas going to the oxidizer.

All aspects of the system may be controlled by a programmable logic controller. Feed back loops may be established based on gas and char temperatures at various points in the process. Automated adjustments may be made to the dwell time of the fuel in various zones of the process or in the amount of air introduced to maintain a consistent biochar.

Examples

In the following examples, a new gasification technology was used to integrate farm wastes into fertilizer and energy.

A carbon rich product called biochar is generated from this process. Biochar is mainly produced from the pyrolysis of crop and animal manure. Biochar is understood to be a valuable material for its improving stability in soil and nutrient retention properties, which could be beneficial for the environment and in certain agricultural applications.

Five biochar samples (summarized in Table 1) produced using the methods described herein were tested.

TABLE 1

Samples

| Sample ID | Description | Location |
|---|---|---|
| 6077 | Frye Poultry-broiler manure | Wardensville, WV |
| 6078 | P&J-Turkey litter | Northfield, MN |
| 6079 | Egg layer manure without Carbon | Carterville, IL |
| 6080 | Egg layer manure with Carbon | Carterville, IL |
| 6082 | Horse muck | Carterville, IL |

The samples were investigated for the chemical and mineral content and mineral release capacity by X-Ray Fluorescence Spectroscopy (XRF), X-Ray Di-fraction Spectroscopy (XRD). Carbon-Sulfur Analyzer, Inductively Couple Plasma Spectroscopy (ICP) and Phosphate Analyzer.

Elemental data were obtained from XRF with a universal method: however this is not a calibrated method. Therefore the data presented in Table 2 should be considered semi quantitative except for the sulfur and carbon data shown in first two rows. Both carbon and sulfur data were obtained from Leco C—S Analyzer. Calcium, Potassium and Phosphorus are the dominant elements detected through out the samples. The table below list the major components detected, for the full list of elements detected please refer to the appendix.

TABLE 2

Elemental analysis of Biochar samples

| % | 6077 Frye | 6078 P&J | 6079 No C | 6080 With C | 6082 Horse muck |
|---|---|---|---|---|---|
| Sulfur | 1.75 | 1.4 | 0.41 | 0.62 | 0.18 |
| Carbon | 21.9 | 9.52 | 3.45 | 7.9 | 15.4 |
| Calcium | 16.8 | 21.7 | 54.4 | 35.2 | 35.8 |
| Silicon | 2.3 | 3.51 | 0.6 | 5.5 | 8.4 |
| Phosphorus | 7.1 | 9.9 | 3.8 | 4.9 | 3.7 |
| Potassium | 16.2 | 13.2 | 5.5 | 4.7 | 5.8 |
| Aluminum | 1.6 | 0.9 | 0.2 | 2 | 2.3 |
| Magnesium | 3.5 | 4.4 | 1.6 | 2.3 | 2 |
| Sodium | 2.7 | — | — | — | — |
| Iron | 2.1 | 1.3 | 0.9 | 5.7 | 2 |
| Chloride | 5.7 | — | — | — | — |

Table 3 summarizes the chemical composition of minerals determined by XRD. The Biochar from Frye-broiler manure shows some variability in the chemical composition compared to the rest of the samples. Potassium sodium calcium phosphate, sylvite, quartz, and calcite are the most common minerals found within all of the Biochar samples.

| % | 6077 Frye | 6078 P&J | 6079 PT no C | 6080 PT with C | 6082 Horse muck |
|---|---|---|---|---|---|
| Sulfur, S | 1.75 | 1.4 | 0.41 | 0.62 | 0.18 |
| Carbon, C | 21.9 | 9.52 | 3.45 | 7.9 | 15.4 |
| Apthitalite, $K_3Na(SO_4)_2$ | 24.9 | — | — | — | — |
| Whitlockite, $HCa_9Mg(PO_4)_7$ | 17.8 | — | — | — | — |
| Sylvite, KCl | 16.4 | 4.5 | 3.3 | 3.2 | 1.9 |
| Quartz, $SiO_2$ | 6.3 | 5.2 | 4.33 | 6.8 | 56.6 |
| Calcite, $CaCO_3$ | 5.7 | 4.5 | 18.6 | 6.8 | 14.4 |
| Ammonium potassium Sulfate, $NH_4KSO_4$ | 4.6 | — | — | — | — |
| Hematite, $Fe_2O_3$ | 3.8 | — | — | — | — |
| Potassium sodium calcium phosphate, $KNaCa_2(PO_4)_4$ | — | 38 | 28.5 | 30.4 | 16.8 |
| Potassium calcium magnesium phosphate, $CaMgK(PO_4)_7$ | — | 21.8 | — | — | — |
| Hydroxylapatite, $Ca_{10}(PO_4)_6·H_2O$ | — | 17.6 | 16.4 | 18.7 | 7.8. |
| Portlandite, $Ca(OH)_2$ | — | — | 28.3 | 10.2 | 1.9 |
| Periclase, MgO | — | — | 3.8 | 4.3 | — |
| Lime, CaO | — | — | — | 12.5 | 0.6 |
| Others, amorphous | 20.4 | 8.5 | — | 7.1 | — |

Among the biochar samples, the Frye broiler manure showed the highest carbon content. Therefore this sample was selected for the leachability study (TCLP: Toxicity Characteristic Leaching Procedure) and further processed through a lab oxidation process to remove the carbon. The ash obtained from oxidation was compared to the original sample by MLR. The TCLP samples were prepared under neutral conditions to have a true comparison to leachability in the field. This experiment was conducted to compare straight oxidation of the manure rather than gasification where retained carbon may aid in the slow release of the fertilizer into the plant and the environment. The results of leachable metals, total nitrogen, phosphorus, total sulfur and carbon in neutral water leachate were shown in Table 4.

| | 6077 Frye | 6077 Lab Gasified Frye |
|---|---|---|
| Sulfur (%) | 1.75 | 4.05 |
| Carbon (%) | 21.9 | 0.11 |
| TCLP data: in neutral water | mg/L | mg/L |
| Total Nitrogen by TKN | 6.5 | 6.1 |
| Phosphorous | 3.9 | 9.2 |
| Silver | — | — |
| Aluminum | 0.42 | 0.72 |
| Arsenic | 0.26 | 0.1 |
| Boron | 1.4 | 2.5 |
| Barium | 0.01 | 0.17 |
| Beryllium | — | — |
| Calcium | 35 | 9 |
| Cadmium | — | — |
| Cobalt | 0.031 | — |
| Chromium | 0.079 | 0.84 |
| Copper | 3.6 | — |
| Iron | 0.37 | — |
| Potassium | >900 | >900 |
| Lithium | 0.02 | 0.35 |
| Magnesium | 78 | 4 |
| Manganese | 0.079 | — |
| Molybdenum | 0.85 | 2.7 |
| Sodium | 430 | >900 |
| Nickel | 0.093 | — |
| Lead | — | — |
| Antimony | 0.01 | 0.011 |

-continued

|  | 6077 Frye | 6077 Lab Gasified Frye |
|---|---|---|
| Selenium | 0.045 | 0.09 |
| Silicon | 1.8 | 2.3 |
| Tin | — | — |
| Strontium | 0.062 | 0.076 |
| Titanium | — | — |
| Thallium | — | — |
| Vanadium | 0.032 | 0.098 |
| Zinc | 0.12 | — |
| Zirconium | 0.047 | 0.11 |

The elemental analysis shows that the process may be adjusted to control the carbon content that is retained in the gasification process. The mineral content surely depends on the type of feedstock. The composition of manure varies significantly from chickens (broiler vs. egg layer), turkeys, and horses. Biochar from horse manure is from grazing based on the high silica content. The process appears to remove significant nitrogen in the gasification process.

The leachability study took the highest fixed carbon gasified manure (6077) and oxidized the carbon away to simulate burning (oxidizing) rather than gasification. This ensured removal of carbon from the manure leaving only oxidized mineral matter. The difference between gasified and oxidized samples in their leachability should be related to fixed carbon in the gasified samples retaining or slowing the release of these minerals into the water. Since the gasified sample contained 21% carbon there will be 21% higher concentration of the minerals in the oxidized sample. The results from the leachability found that the minerals in the gasified sample were only marginally different than the oxidized sample. Again it would be expected that metals in the oxidized sample should be ~20% higher due to a more concentrated (no or less carbon) mineral being present. Total nitrogen was virtually unchanged. However phosphorous was reduced significantly when gasified which would support a slower release to plants and the environment. Chrome also showed a significant reduction when gasified. Overall the study found that gasified manure may have some benefits over oxidized manure. Additional testing was conducted using cattle manure was also conducted according to the methods described above. The gasification system has proven to effectively process a variety of fuels to produce a quality biochar product. The specific quality of the biochar is dependent on the composition of the fuel. Cow or cattle manure is one of the fuels that have been gasified and shown to produce a valuable biochar product. The quality of the biochar will vary slightly with cow manure depending on the animal diet, but can have a fairly large variation depending on the material handling methods employed on the farm where the manure is generated. Additionally, the gasification process also has some control over the quality; especially in the area of carbon content. An example of a biochar product from cow manure is shown in the mineral analysis shown in table 5.

TABLE 5

|  | As Received | Dry | MAF |
|---|---|---|---|
| % Total Moisture | 0.51 |  |  |
| % Ash | 78.65 | 79.05 |  |
| % Volatile Matter | 7.46 | 7.50 |  |
| % Fixed Carbon | 13.38 | 13.45 |  |
| % Sulfur | 0.50 | 0.50 |  |

TABLE 5-continued

| Grass Calorific Value, btu/lb | 2530 | 2543 | 12140 |
|---|---|---|---|

| Analyte | Result |
|---|---|
| ANALYSIS OF ASH | |
| Silicon dioxide | 55.36% |
| Aluminum oxide | 4.99% |
| Titanium dioxide | 0.23% |
| Iron oxide | 1.77% |
| Calcium oxide | 13.08% |
| Magnesium oxide | 3.68% |
| Potassium oxide | 8.56% |
| Sodium oxide | 3.02% |
| Sulfur trioxide | 1.42% |
| Phosphorus pentoxide | 6.78% |
| Strontium oxide | 0.04% |
| Barium oxide | 0.05% |
| Manganese oxide | 0.03% |
| Undetermined | 0.99% |
| MAA Sum | 99.01% |
| MAA Basis | Ignited s.u. |
| MAA Silica Value | 74.92% |
| MAA Based Acid Ratio | 0.50% |
| MAA T250 | 2315° F. |
| MAA Type of Asin | LIGNITIC s.u. |
| Fouling Index | 3.02% |

What is claimed is:

1. A continuous system for gasification of a high ash biomass feedstock, wherein the high ash biomass feedstock comprises primarily farm wastes, comprising:
    a fuel conditioning zone including an animal manure dryer and a fuel metering bin;
    a reaction zone, the reaction zone including a controllable system for introducing air into the high ash biomass feedstock, the air being introduced at approximately ¼ of a level required for complete oxidation of the high ash biomass feedstock, wherein the reaction zone includes a live floor having multiple augers in a side by side configuration, and wherein a speed of the multiple augers is controlled so that the high ash biomass feedstock is taken away at a rate at which it is introduced;
    a char cooling area, the char cooling area having a gas capturing system for recovering gas released by the char in the char cooling area as the char cools and where the char cooling area includes at least one char removal auger, the char removal auger running in a direction transverse to the live floor, wherein the carbon content of the char is adjusted by varying one or more of the feed rate of the fuel and air into the system, and wherein a biochar with high carbon content is produced; and
    a controller configured to adjust dwell time of the high ash biomass feedstock in the fuel conditioning zone, the reaction zone, and the char cooling area, and maintain a continuous process.

2. The system of claim 1, wherein air is introduced into the gasification zone at a level below that required for complete combustion.

3. The system of claim 1, wherein the gas capturing system of the char cooling area includes a gas return to direct at least a portion of the captured gas to the reaction zone.

4. The system of claim 1, wherein the high ash biomass feedstock is animal manure.

5. The system of claim 1, wherein the reaction zone is operated with a gas outlet temperature of about 400 to 600° C.

6. The system of claim 1, wherein the gas recovered from the char cooling area and from the reaction zone is combusted in a secondary chamber.

7. The system of claim 6, wherein the secondary chamber is operated with a flue gas outlet temperature of about 1200° C.

8. A continuous system for gasification of a high ash biomass feedstock, wherein the high ash biomass feedstock comprises primarily farm wastes, comprising:
- a fuel conditioning zone wherein the high ash biomass feedstock including animal manure is pre-heated, the fuel conditioning zone including a fuel dryer and a fuel metering bin;
- a reaction zone, the reaction zone including a controllable system for introducing air into the high ash biomass feedstock, the air being introduced at approximately ¼ of a level required for complete oxidation of the high ash biomass feedstock, the controllable system for introducing air into the biomass further including an auger system having at least two augers positioned side by side to move material evenly across a length and a width of the reaction zone, and wherein a speed of the at least two augers is controlled so that the biomass feedstock is taken away at a rate at which it is introduced;
- a char cooling area, the char cooling area having a gas capturing system for recovering gas released by the char in the char cooling area as it cools and from the reaction zone and where the char cooling area includes at least one char removal auger, the char removal auger running in a direction transverse to a live floor, wherein the carbon content of the char is adjusted by varying one or more of the feed rate of the fuel and air into the system, and wherein a biochar with high carbon content is produced;
- a chamber wherein the gas recovered from the char cooling area and from the reaction zone is mixed with oxidizer air and oxidized; wherein heat is recovered from a resulting flue gas before admission to the fuel conditioning zone; and
- a controller configured to adjust dwell time of the high ash biomass feedstock in the fuel conditioning zone, the reaction zone, the char cooling area and the chamber, and maintain a continuous process.

9. The system of claim 8, wherein the high ash biomass feedstock is animal manure.

10. The system of claim 8, wherein the reaction zone is operated with a gas outlet temperature of about 400 to 600° C.

11. The system of claim 8, wherein the chamber is operated with a flue gas outlet temperature of about 1200° C.

12. A continuous system for gasification of a high ash biomass feedstock, wherein the high ash biomass feedstock comprises primarily farm wastes, comprising:
- a fuel conditioning zone wherein the high ash biomass feedstock including animal manure is pre-heated and/or dried, the fuel conditioning zone including a fuel dryer and a fuel metering bin;
- a reaction zone, the reaction zone including a controllable system for introducing air into the biomass, the air being introduced at approximately ¼ of a level required for complete oxidation of the high ash biomass feedstock, the controllable system for introducing air into the high ash biomass feedstock further including an auger system having at least two augers positioned side by side to move material evenly across a length and a width of the reaction zone, the auger system also including a transverse auger that runs transverse to the direction of the at least two augers to remove char from the reaction zone, and wherein a speed of the at least two augers is controlled so that the biomass feedstock is taken away at a rate at which it is introduced;
- a char cooling area, the char cooling area having a gas capturing system for recovering gas released by the char in the char cooling area as it cools and routing the captured gas to the reaction zone, wherein the carbon content of the char is adjusted by varying one or more of the feed rate of the fuel and air into the system, and wherein a biochar with high carbon content is produced;
- a chamber wherein the gas recovered from the char cooling area and from the reaction zone is mixed with oxidizer air and oxidized; wherein heat is recovered from a resulting flue gas before admission to the fuel conditioning zone; and
- a controller configured to adjust dwell time of the high ash biomass feedstock in the fuel conditioning zone, the reaction zone, the char cooling area and the chamber, and maintain a continuous process.

13. The system of claim 12, wherein the high ash biomass feedstock is animal manure.

14. The system of claim 12, wherein the reaction zone is operated with a gas outlet temperature of about 400 to 600° C.

15. The system of claim 12, wherein the chamber is operated with a flue gas outlet temperature of about 1200° C.

\* \* \* \* \*